United States Patent
Lin et al.

(10) Patent No.: US 11,841,922 B2
(45) Date of Patent: Dec. 12, 2023

(54) SYSTEM AND METHOD FOR CLASSIFYING AND LABELING IMAGES

(71) Applicant: Awoo Intelligence, Inc., Taipei (TW)

(72) Inventors: Szu-Wu Lin, Taipei (TW); Gang-Feng Ho, Taipei (TW); Kuo Ming Lin, Taipei (TW)

(73) Assignee: AWOO INTELLIGENCE, INC., Taipei (TW)

( * ) Notice: Subject to any disclaimer, the term of this patent is extended or adjusted under 35 U.S.C. 154(b) by 246 days.

(21) Appl. No.: 17/330,135

(22) Filed: May 25, 2021

(65) Prior Publication Data
US 2022/0253645 A1    Aug. 11, 2022

(30) Foreign Application Priority Data
Feb. 9, 2021   (TW) .................................. 110105018

(51) Int. Cl.
| | |
|---|---|
| G06V 20/70 | (2022.01) |
| G06F 18/214 | (2023.01) |
| G06V 10/40 | (2022.01) |
| G06F 18/2413 | (2023.01) |
| G06V 10/764 | (2022.01) |
| G06V 10/774 | (2022.01) |
| G06V 20/00 | (2022.01) |

(52) U.S. Cl.
CPC ........ *G06F 18/214* (2023.01); *G06F 18/2413* (2023.01); *G06V 10/40* (2022.01); *G06V 10/764* (2022.01); *G06V 10/774* (2022.01); *G06V 20/35* (2022.01); *G06V 20/70* (2022.01)

(58) Field of Classification Search
CPC ... G06F 18/214; G06F 18/2413; G06V 10/40; G06V 10/764; G06V 10/774; G06V 20/63; G06V 20/70
See application file for complete search history.

(56) References Cited

U.S. PATENT DOCUMENTS

| | | | |
|---|---|---|---|
| 8,374,979 B2 * | 2/2013 | Zhou .................... | G06V 10/426 |
| | | | 706/12 |
| 9,355,330 B2 | 5/2016 | Chua et al. | |
| 9,443,314 B1 * | 9/2016 | Huang ................... | G06V 20/35 |

(Continued)

FOREIGN PATENT DOCUMENTS

| | | |
|---|---|---|
| CN | 106909694 B | 1/2020 |
| JP | 2020140488 A | 9/2020 |
| TW | 201913493 A | 4/2019 |

*Primary Examiner* — Aaron W Carter
(74) *Attorney, Agent, or Firm* — Muncy, Geissler, Olds & Lowe

(57) ABSTRACT

Method and system for classifying and labeling images, which can perform segmentation based on features of each part of images, classify and match the image and the segmented image based on a classification model built by the machine learning method. Meanwhile, each image is assigned with labels and text descriptions. The system also includes a string module assigning the image with a plurality of matching labels and text descriptions that are the most relevant in recent times. Furthermore, the classification model is trained by machine learning method such as an unsupervised learning, a self-supervised learning, or a heuristic algorithms. In addition, a character recognition module is provided to extract characters in the image for comprehensive learning and calculations to facilitate classification and labeling of the image.

9 Claims, 10 Drawing Sheets

(56) References Cited

U.S. PATENT DOCUMENTS

| | | | |
|---|---|---|---|
| 10,191,921 B1* | 1/2019 | Can | G06N 3/042 |
| 10,665,030 B1* | 5/2020 | Shekhar | G06F 40/30 |
| 10,943,117 B2* | 3/2021 | Beller | G06F 3/0304 |
| 11,410,033 B2* | 8/2022 | Neves | G06F 18/22 |
| 2011/0052063 A1* | 3/2011 | McAuley | G06V 20/35 |
| | | | 382/224 |
| 2012/0039527 A1* | 2/2012 | Qi | G06V 10/764 |
| | | | 382/159 |
| 2012/0269436 A1* | 10/2012 | Mensink | G06V 10/764 |
| | | | 382/180 |
| 2013/0202205 A1* | 8/2013 | Liu | G06F 16/583 |
| | | | 382/170 |
| 2013/0259375 A1* | 10/2013 | Dunlop | G06V 20/38 |
| | | | 382/173 |
| 2014/0355879 A1* | 12/2014 | Agosta | G06T 7/143 |
| | | | 382/199 |
| 2016/0055237 A1* | 2/2016 | Tuzel | G06F 18/24323 |
| | | | 382/224 |
| 2016/0171707 A1* | 6/2016 | Schwartz | G06F 18/22 |
| | | | 382/180 |
| 2017/0206435 A1* | 7/2017 | Jin | G06F 18/2431 |
| 2017/0206465 A1* | 7/2017 | Jin | G06F 16/5866 |
| 2017/0228616 A1* | 8/2017 | Tasdizen | G06F 18/24765 |
| 2017/0300737 A1* | 10/2017 | Wang | G06V 30/274 |
| 2018/0197223 A1* | 7/2018 | Grossman | G06F 3/0482 |
| 2019/0318405 A1 | 10/2019 | Hu et al. | |
| 2020/0233898 A1* | 7/2020 | Barzelay | G06Q 30/0272 |
| 2020/0285879 A1* | 9/2020 | Cheng | G06V 10/768 |
| 2021/0209765 A1* | 7/2021 | Yang | G06T 7/174 |
| 2022/0129704 A1* | 4/2022 | Murata | G06F 18/2148 |
| 2022/0253645 A1* | 8/2022 | Lin | G06V 10/40 |
| 2022/0342928 A1* | 10/2022 | Flagg | G06V 10/82 |
| 2022/0358379 A1* | 11/2022 | Jain | G06N 5/022 |

* cited by examiner

SYSTEM AND METHOD FOR CLASSIFYING AND LABELING IMAGES

BACKGROUND OF INVENTION

(1) Field of the Present Disclosure

The present disclosure relates to a method and a system for classifying and labeling images, and more particularly to a system and a method that employs artificial intelligence to segment images and to recognize texts, and performs classification and matching, labeling, and text description.

(2) Brief Description of Related Art

With the development of science and technology, image classification is now widely applied to various fields, from daily photography to industrial production. A demand for image classification is booming. The related disclosures of the prior art include:
a) "Method for Improving the Accuracy of Product Recommendation" (TW201913493), by which the user can input the product image file, and the shopping platform can individually identify the product image and generate the product label associated with the product image;
b) "Product identification in image with multiple products" (US20190318405A1), by which a product image can be identified. Meanwhile, the information (brand, model or product description) of the identified product can also be provided.
c) "Method and Device for Obtaining Classification Label Data" (CN106909694B);
d) "In-video product annotation with web information mining" (U.S. Ser. No. 09/355,330B2); and
e) "Information processing device, information processing method, and data processing device" (JPA 2020140488).

The above-mentioned solutions disclosed in the prior art can identify products through images, classify them and label them with information. However, products often have multiple attributes and require multiple label information to be presented. Moreover, a number of terms used in label information are outdated and non-modern. In addition, the correlation between products, and even the quick text description of products, are all requirements for today's business applications. Accordingly, how to classify and match images quickly and accurately, how to assign multiple information labels corresponding to them, how to assign text description to the image contents quickly, and how to further achieve that labels and text descriptions can be presented with the most relevant words in recent times, are still problems to be resolved.

SUMMARY OF INVENTION

It is a primary object of the present disclosure to provide a method and a system for classifying and labeling images. According to the present disclosure, the system for classifying and labeling images includes a central processing module, an input module, a storage module, a segmentation module, an artificial intelligence module, and a string module. The artificial intelligence module uses training images in the storage module as training data and uses a machine learning method to build a classification model. The input module is employed to receive an image under the classification. The artificial intelligence module classifies the image under the classification based on the classification model. The segmentation module can identify features of each part of the image under the classification, and further segment, classify and match it. The artificial intelligence module cooperates with the string module to assign at least one label and a text description to the classified and matched images. In addition, the present disclosure further includes a character recognition module for recognizing the characters in the image for comprehensive learning and operation.

DETAILED DESCRIPTION OF PREFERRED EMBODIMENTS

Figure 1:
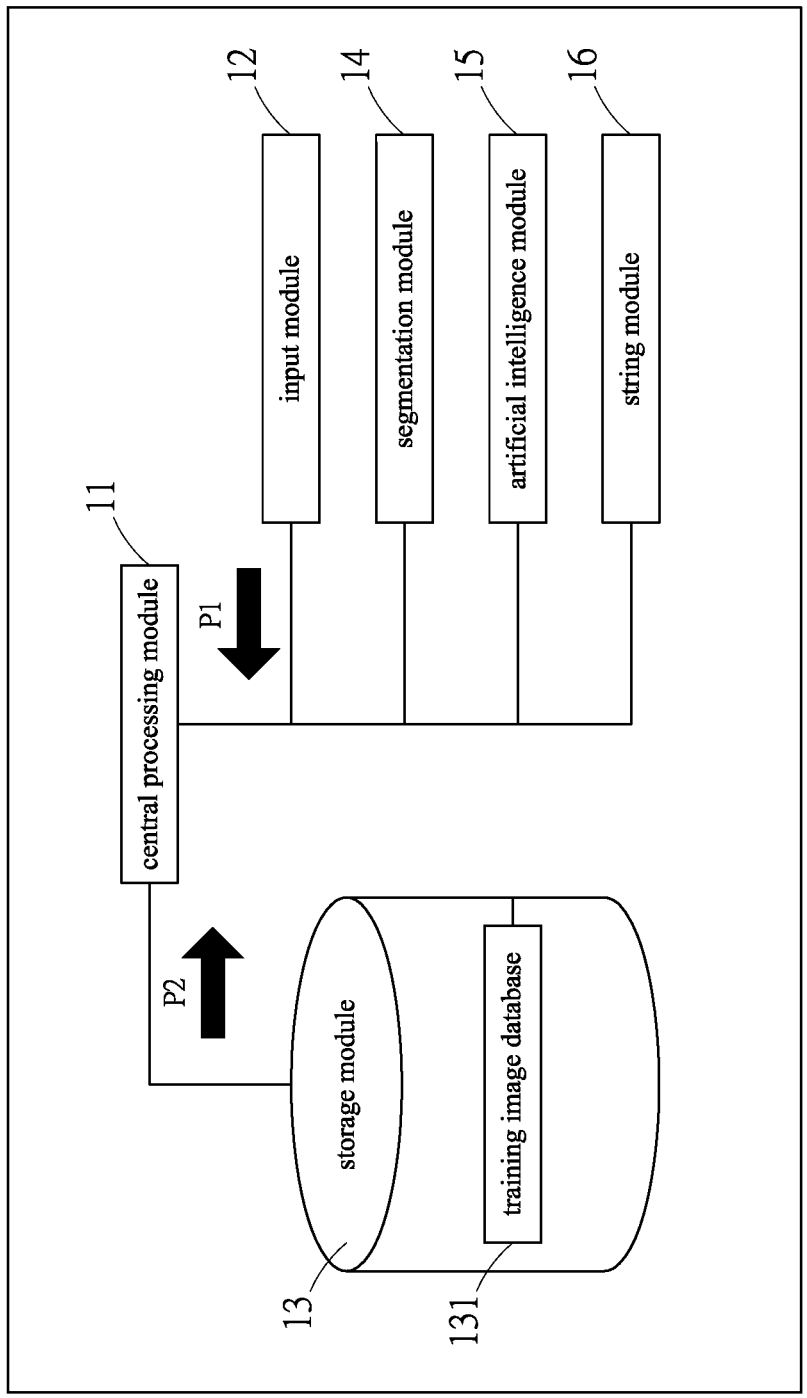
FIG. 1 is a schematic drawing of the composition of the present disclosure.

Referring to FIG. 1, an image classification and labeling system 1 according to the present disclosure includes a central processing module 11. Meanwhile, an input module 12, a storage module 13, a segmentation module 14, an artificial intelligence module 15, and a string module 16 are connected to the central processing module 11.

The central processing module 11 is employed to operate the image classification and labeling system 1 and to drive the input module 12, the storage module 13, the segmentation module 14, the artificial intelligence module 15, and the string module 16 in operation. The central processing module 11 fulfills functions such as logic operations, temporary storage of operation results, storage of the position of execution instructions, etc. It can be a central processing unit (CPU), but is not limited thereto.

The input module 12 is employed to receive at least one image P1 under the classification, which can be a universal serial bus (USB), a serial port (such as RS232 or RS485), a peripheral component interconnect express (PCIE), etc. It can be replaced by a wireless transmission means, such as Bluetooth, Wi-Fi, etc. In addition, the images P1 can be obtained through browser search, data capture, web crawler, etc. or a combination thereof, but it is not limited thereto.

The storage module 13 provides data required for training of the artificial intelligence module 15. The storage module 13 further includes a training image database 131. The training image database 131 stores at least one training image P2. The training image P2 can be a labeled image with one or a combination of labels or text descriptions, or an image without labels or text descriptions. The artificial intelligence module 15 uses the training image P2 for training to build a classification model.

The segmentation module 14 is used to identify and detect each object in the image P1, and divide different objects in the image P1 into a plurality of segmented images P3 to further analyze the images.

The artificial intelligence module 15 employs the data in the storage module 13 for performing the training process to build the classification model. The machine learning performed by the artificial intelligence module 15 includes one or a combination of an un-supervised learning and a self-supervised learning. The artificial intelligence module 15 classifies and matches the images P1 and the segmented image P3 based on the classification model built by training, and assigns labels and/or text descriptions to the images P1 and the segmented image P3. The artificial intelligence module 15 calculates correlation scores between the segmented images P3 based on the content, relative position, size, and correlation between the segmented images P3 in the image P1. Therefore, the artificial intelligence module 15 can assign more appropriate labels and/or text descriptions to the images P1 and the segmented image P3 according to the correlation scores.

The string module 16 can collect text and extract valuable words in the text by means of machine learning. The valuable words are popular words with high search frequency and topicality, and the related words are connected with each other to form a string network, which is stored in the storage module 13. The artificial intelligence module 15 can cooperate with the string module 16 and assign labels and/or text descriptions to classified images (e.g., the images P1 and the segmented images P3 that are classified) based on the string network.

Figure 2:
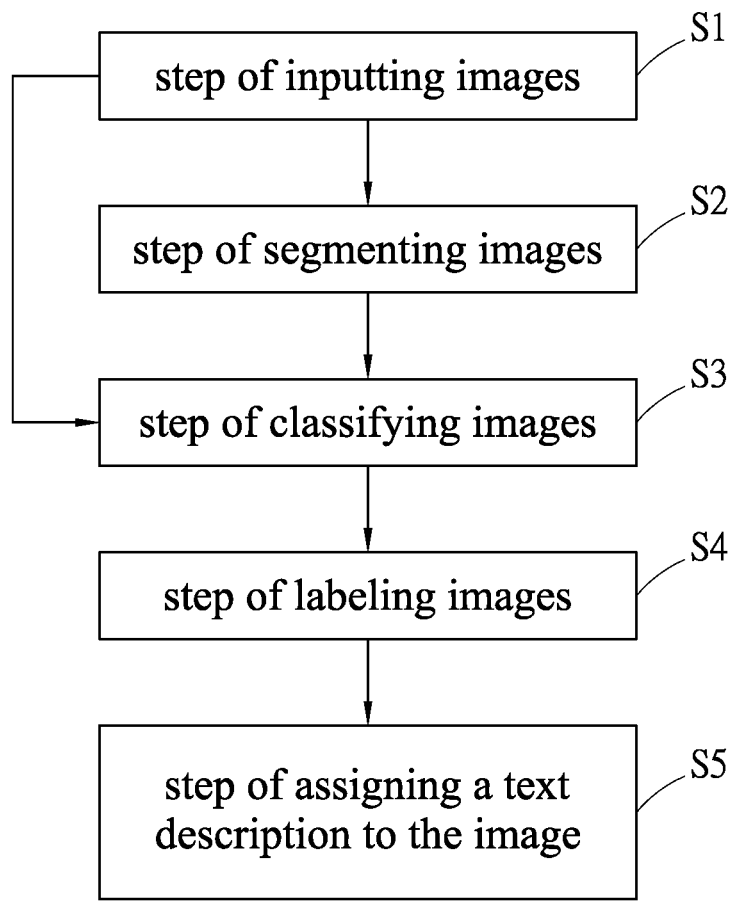
FIG. 2 is a flow chart I of the present disclosure.
Figure 3:
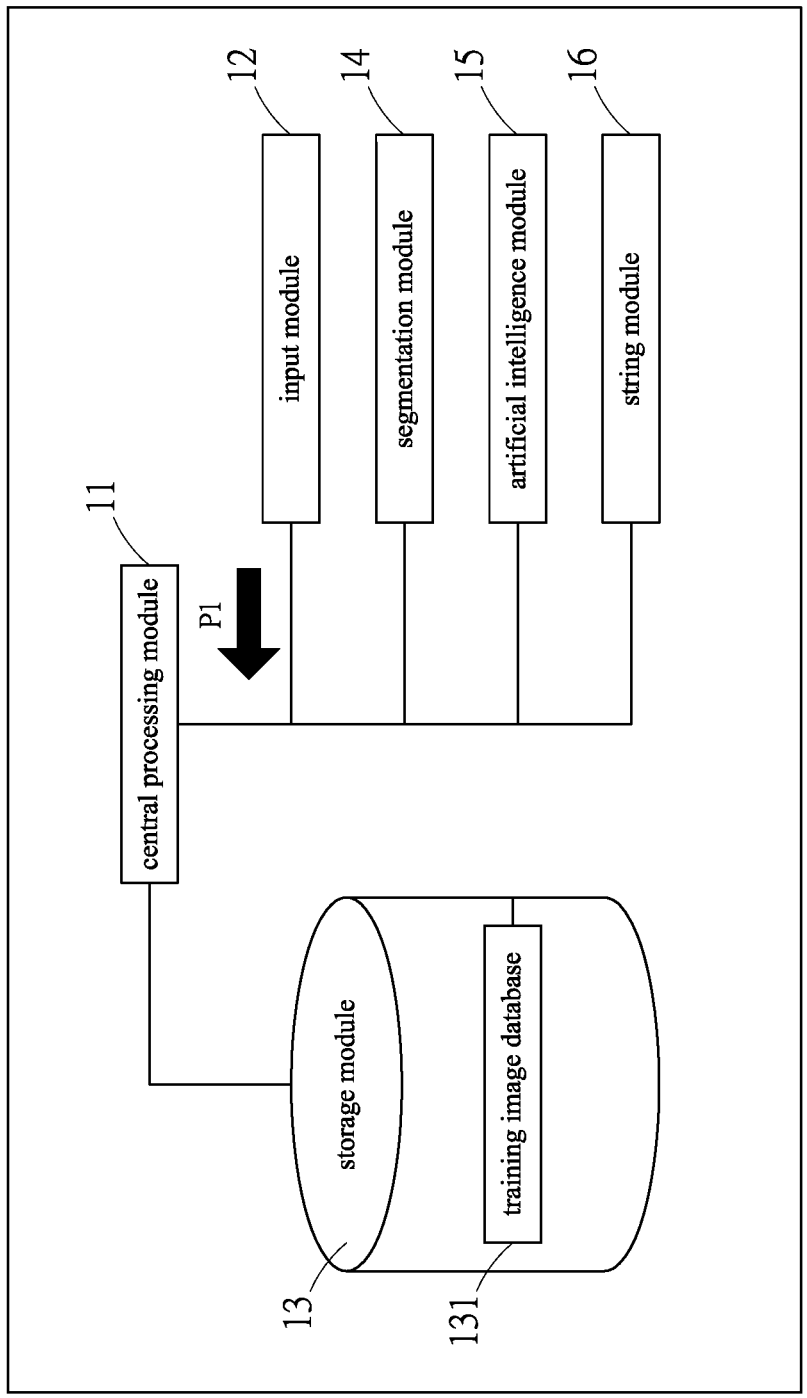
FIG. 3 is a schematic drawing I of the implementation of the present disclosure.

As illustrated in FIG. 2, the steps of the present disclosure are shown as follows:

(1) Step S1 of Inputting Images:

As shown in FIG. 3, the input module 13 receives at least one image P1 under the classification. Moreover, the input module 13 can receive the image P1 in a wired or a wireless transmission way.

Figure 4:
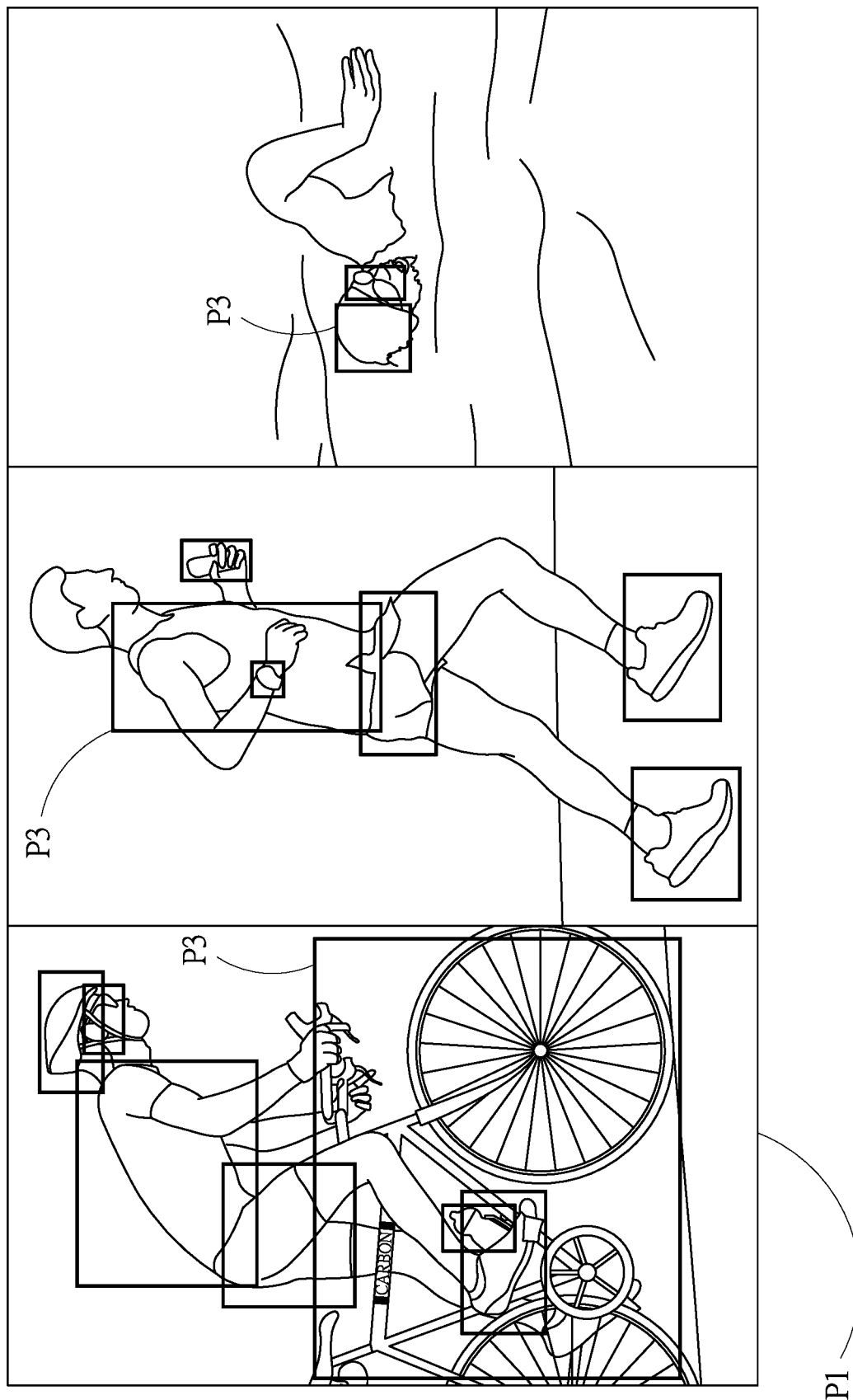
FIG. 4 is a schematic drawing II of the implementation of the present disclosure.

(2) Step S2 of Segmenting Images:

As shown in FIG. 4, the segmentation module 14 can identify and recognize the image P1, and segment it according to features of each part, such that each object in the image P1 is independently divided into segmented images P3 and the artificial intelligence module 15 can make a more comprehensive and further analysis and determination on the overall and various parts of the image P1. As illustrated in the drawing, the input module 13 receives an image P1 of a sports product. Then, the segmentation module 14 recognizes and divides it into segmented images P3 such as "bicycle", "safety helmet", "running shoes", "swimming cap", etc.

(3) Step S3 of Classifying Images:

The artificial intelligence module 15 classifies and matches each image (e.g., the images P1 and the segmented images P3) based on the trained classification model. Each image (P1 and P3) can be classified into a single category, or one of the images (P1 and P3) can be classified into a plurality of categories. The artificial intelligence module 15 calculates correlation scores between the segmented images P3 based on the content, relative position, size, and correlation between the images (P1 and P3) so as to classify the images (P1 and P3). The image P1 input by the step S1 of inputting images can also be directly subjected to the step S3 of classifying images without performing the step S2 of segmenting images. As shown in FIG. 4, the artificial intelligence module 15 can classify the image P1 as "sports". Taking the segmented image P3 "bicycle" in FIG. 4 as an example, the artificial intelligence module 15 can classify it as "bicycle" and "land sports". Due to the images of "bicycle", "swimming cap", "running shoes" and other images, it is concluded that the three are related to a category of "triathlon".

Figure 5:
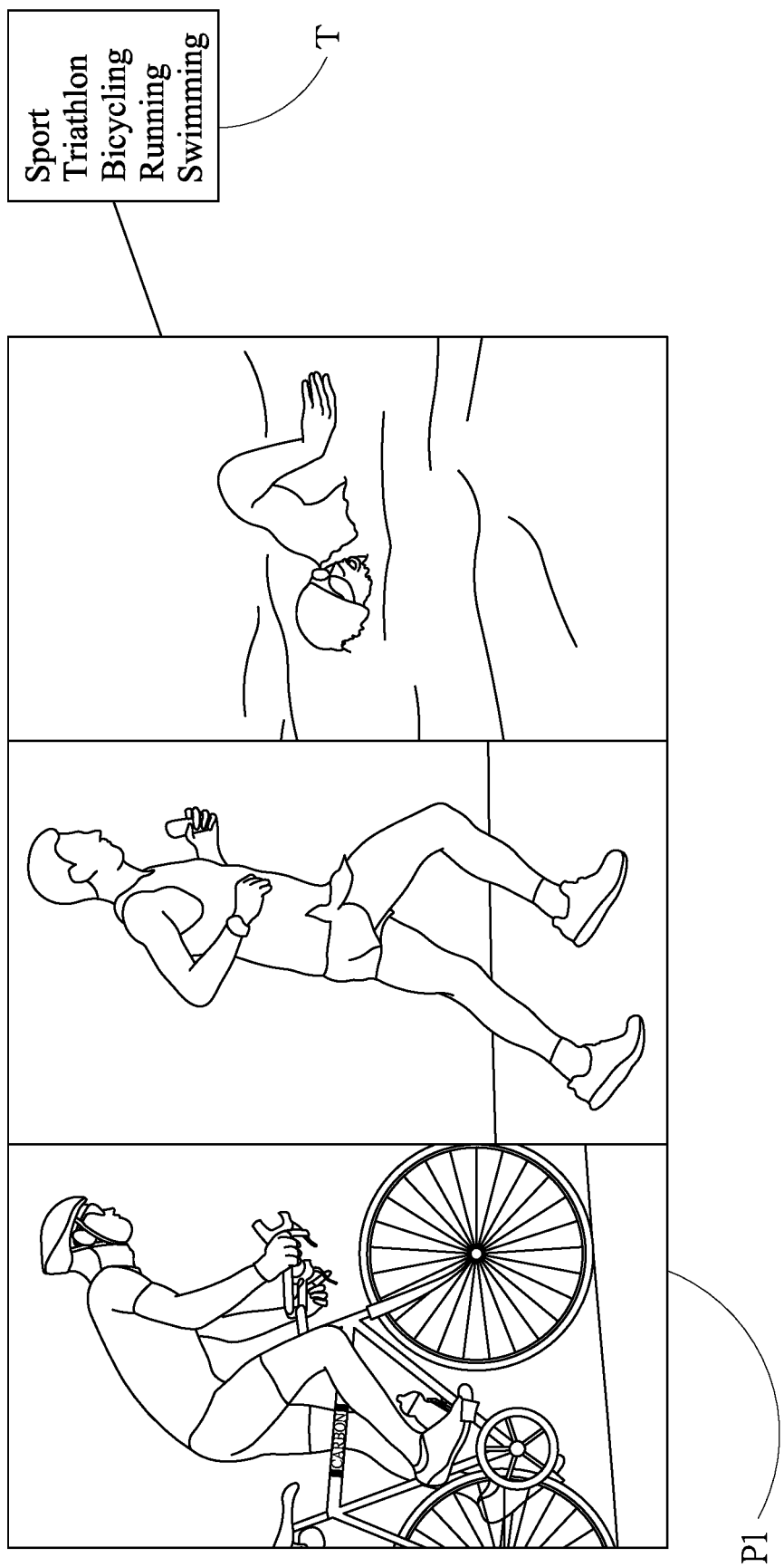
FIG. 5 is a schematic drawing III of the implementation of the present disclosure.
Figure 6:
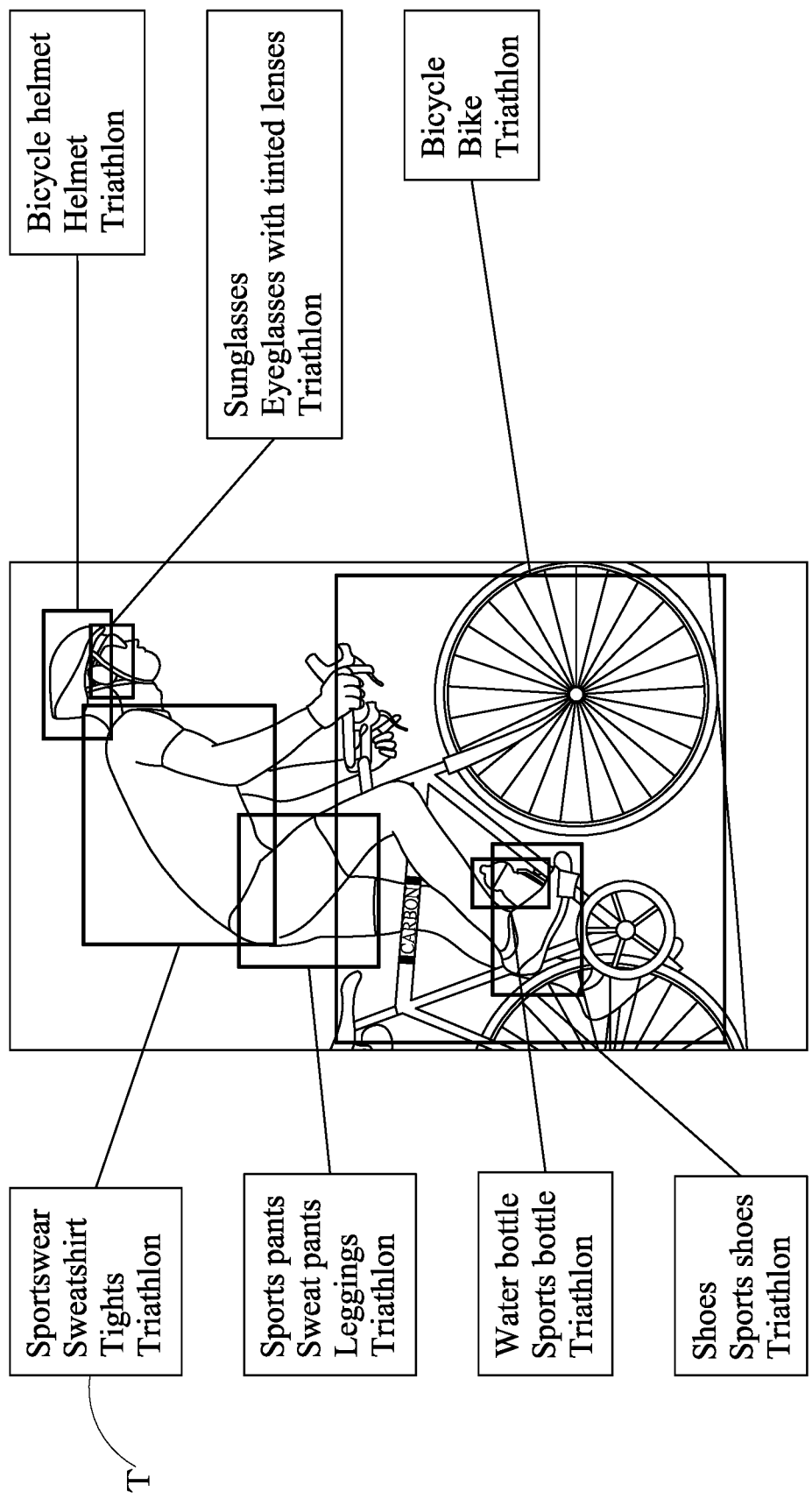
FIG. 6 is a schematic drawing IV of the implementation of the present disclosure.

(4) Step S4 of Labeling Images:

As shown in FIG. 5 and FIG. 6, the artificial intelligence module 15 assigns a label T to the classified and matched images (P1 and P3). Meanwhile, the artificial intelligence module 15 can assign one of the label T to the images (P1 and P3), or assign a plurality of the labels T to the images (P1 and P3). In addition, the artificial intelligence module 15 further cooperates with the string module 16 according to the correlation scores between the segmented images P3 in the image P1 and assign the label T associated with the images (P1 and P3) based on the string network. As shown in FIG. 5, since there are also segmented images of "bicycle", "swimming cap", "running shoes", etc., the image classification and labeling system 1 assigns a "triathlon" label to the image based on the aforementioned segmented images, the correlation scores, and the string network. As shown in FIG. 6, the segmented image P3 "bicycle" is assigned with the labels such as "bicycle", "bicycle", "land sports" and other labels related to its category. In addition, the segmented image P3 "bicycle" is segmented from an image P1 with segmented images P3 such as "swimming cap" and "running shoes". Based on the aforementioned segmented images, the correlation scores, and the string network, the segmented image P3 is assigned with a label of "triathlon".

Figure 7:
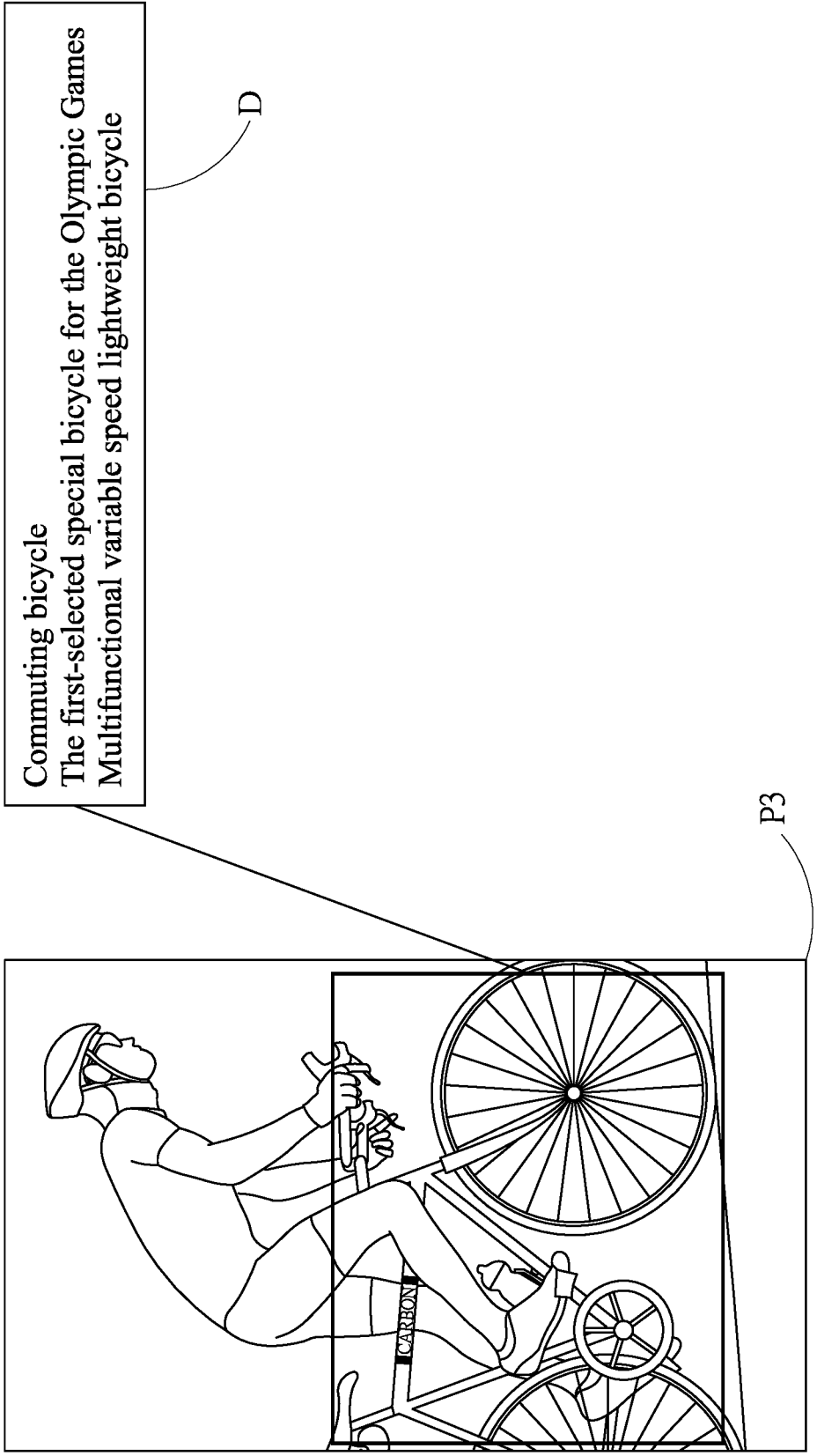
FIG. 7 is a schematic drawing V of the implementation of the present disclosure.

(5) Step S5 of Assigning a Text Description to the Image:

As shown in FIG. 7, the artificial intelligence module 15 cooperates with the string module 16 and assigns a text description D to the image (P1 and P3) based on the string network. The text description D can be a short description of the image (P1 and P3) or a long article. As shown in the drawing, the segmented image P3 "bicycle" is assigned with the text description D such as "commuting bicycle for work", "special bicycle for Olympics", "multi-functional variable speed, lightweight bicycle", etc. in the Olympic year and in the background of epidemic prevention.

Figure 8:
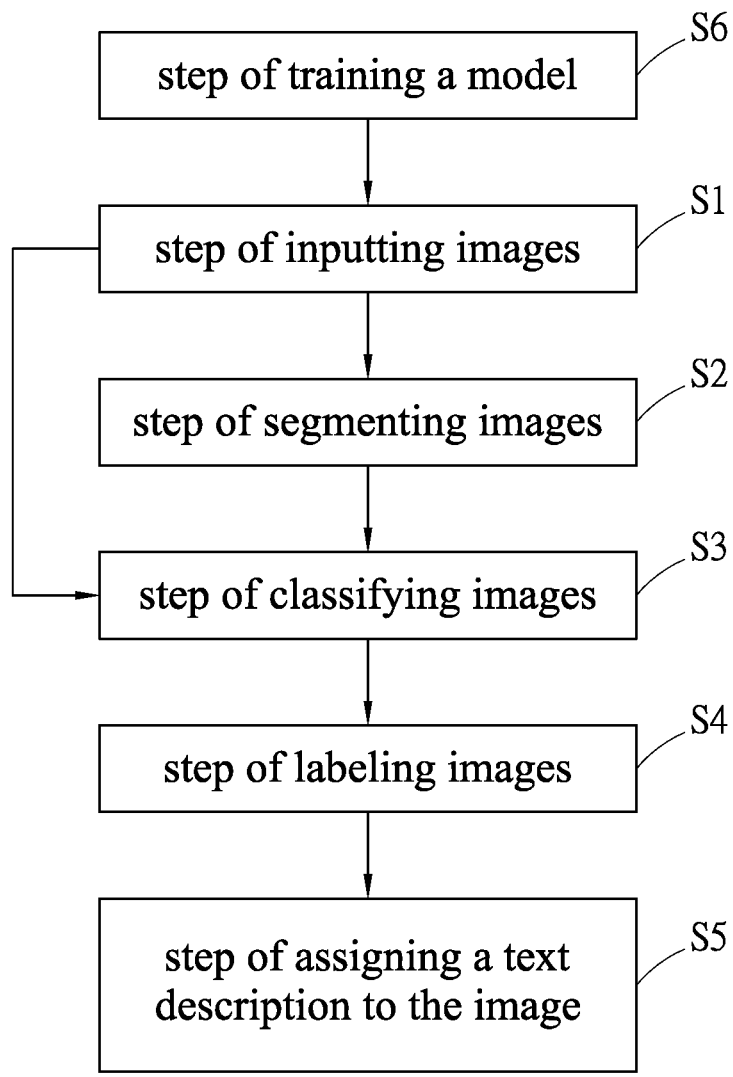
FIG. 8 is a flow chart II of the present disclosure.

As shown in FIG. 8 together with FIG. 2, the present disclosure further includes a step S6 of training a model. Before the step S1 of inputting images, the step S6 of training a model is used to build the classification model of the artificial intelligence module 15. According to the training images P2 and the segmented images P3 in the storage module 13, the machine learning performed by the artificial intelligence module 15 includes one or a combination of an un-supervised learning and a self-supervised learning. Taking the un-supervised learning as an example, the artificial intelligence module 15 uses the un-supervised learning to build a classification model based on the training image P2 without a label T and a text description D in the storage module 13. In addition, the images (P1 and P3) in which the steps S3, S4, and S5 have been completed can also be used as new training data. Since it has been classified and has the label T and/or the text description D, the classification model of the artificial intelligence module 15 can be continuously improved.

Figure 9:
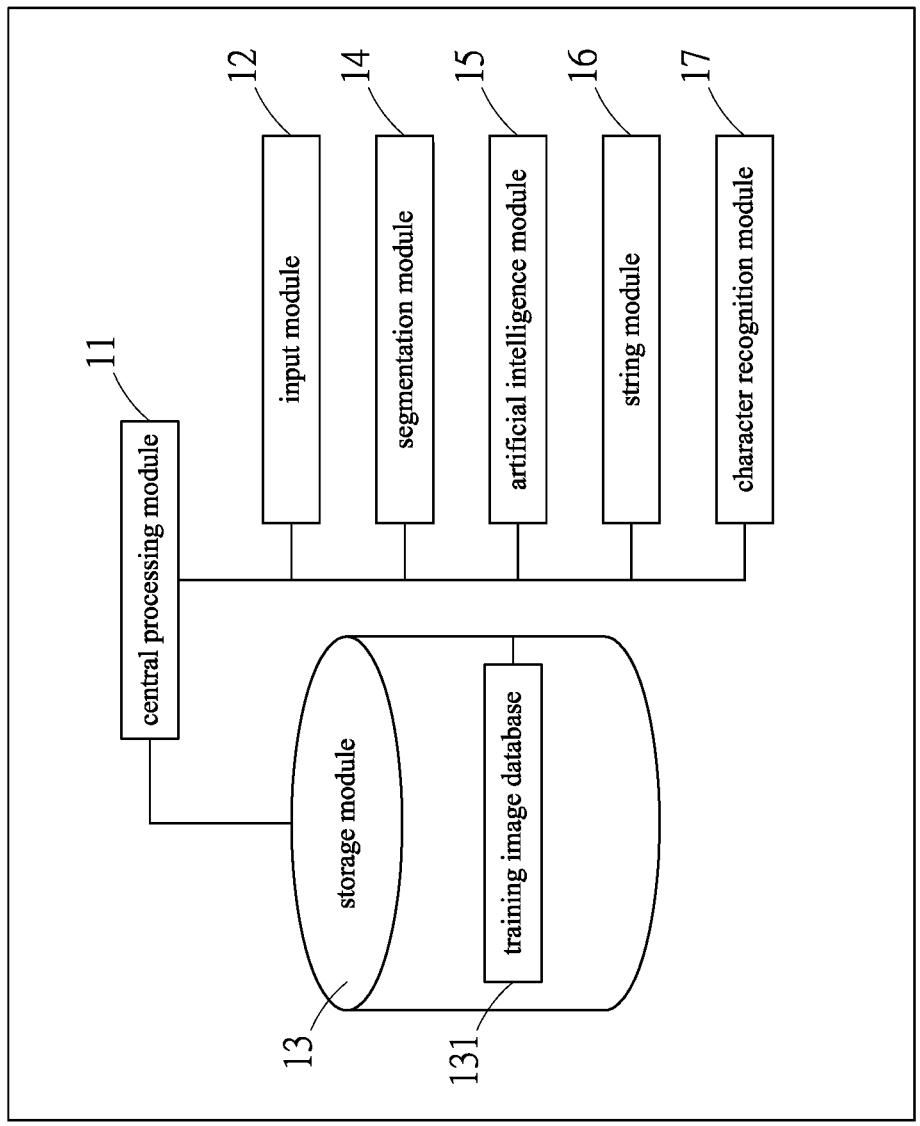
FIG. 9 is a schematic drawing of another embodiment of the present disclosure.
Figure 10:
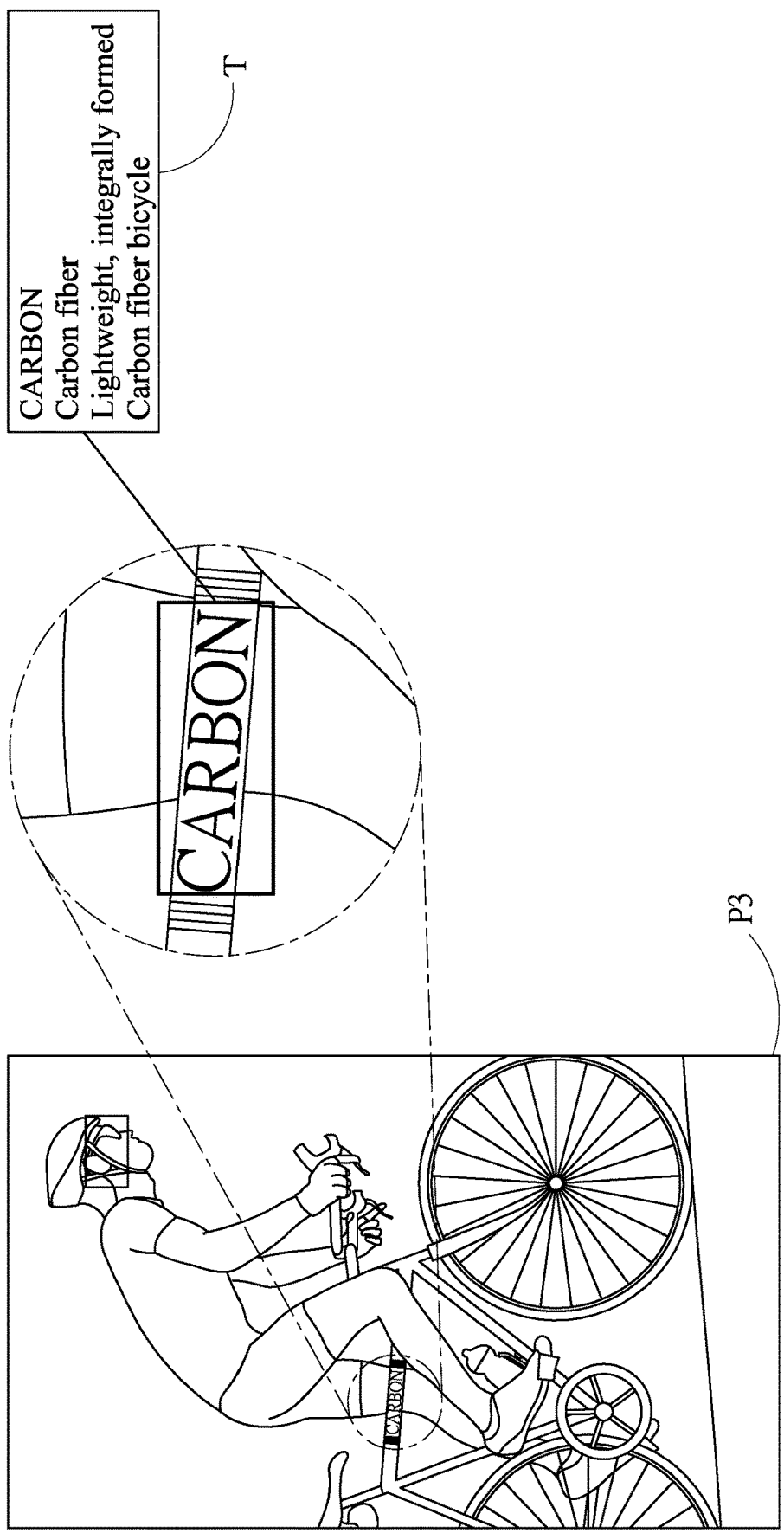
FIG. 10 is a schematic drawing of a further embodiment of the present disclosure.

As shown in FIG. 9 and FIG. 10, the present disclosure further includes a character recognition module 17. The character recognition module 17 is used to extract characters in the image for comprehensive learning and calculation, so that the artificial intelligence module 15 performs more accurate classification and matching when performing the step S4 of labeling the images and the step S5 of assigning a text description to the image. The character recognition module 17 can include, for example, an optical character recognition model (OCR). As shown in the drawing, the image P3 "bicycle" has the word "CARBON" on the frame. In this embodiment, the character recognition module 17 can extract the characters, and assign the image P3 "bicycle" with a more accurate label T and/or text description D ("carbon bike").

In the summary, the system and the method for classifying and labeling images according to the present disclosure includes the central processing module, the input module, the storage module, the segmentation module, the artificial intelligence module, the string module, and the character recognition module. The artificial intelligence module builds the classification model through machine learning. The image can be classified and matched, labeled, and assigned with a text description through the present disclosure. In addition, the segmentation module is used to segment the image according to the characteristics of each image. The string module is used to assign the classified image with the current valuable word label and the text description. Moreover, the string module can recognize the text of the image to achieve more accurate classification, labeling, and text description. Accordingly, after the present disclosure is implemented, it is indeed possible to quickly and accurately classify images and assign them with corresponding labels and text descriptions.

REFERENCE SIGN 1 image classification and labeling system
11 central processing module
12 input module
13 storage module
131 training image database
14 segmentation module
15 artificial intelligence module
16 string module
17 character recognition module
S1 step of inputting images
S2 step of segmenting images
S3 step of classifying images
S4 step of labeling images
S5 step of assigning a text description to the image
S6 step of training a model
P1 image
P2 training image
P3 segmented image
T label
D text description

What is claimed is:

1. A system for classifying and labeling images, comprising:
   central processing circuitry configured to operate the system for classifying and labeling images;
   input circuitry connected to the central processing circuitry and configured to receive an image;
   storage circuitry connected to the central processing circuitry and configured to store a classification model and a string network;
   string circuitry connected to the central processing circuitry and configured to form the string network;
   segmentation circuitry connected to the central processing circuitry and configured to identify and detect a plurality of objects in the image and divide the objects in the image into a plurality of segmented images; and
   artificial intelligence circuitry connected to the central processing circuitry and configured to perform a step of classifying the image and the segmented images based on the classification model and a step of labeling the image,
   wherein the step of classifying comprises: calculating correlation scores between the segmented images based on content, relative position, size, and correlation between the segmented images; and
   wherein the step of labeling comprises: assigning a label reflecting an overall aspect of the segmented images to the image based on the segmented images, the correlation scores, and the string network.

2. The system as claimed in claim 1, wherein the storage circuitry comprises a training image database, the training image database stores at least one training image, and the artificial intelligence circuitry builds the classification model according to the training image.

3. The system as claimed in claim 1, wherein character recognition circuitry is connected to the central processing circuitry and configured to extract characters in the image.

4. The system as claimed in claim 2, wherein the training image database stores the image with at least one label or at least one text description as the training image.

5. A method for classifying and labeling images, comprising following steps:
   inputting an image, wherein a system for classifying and labeling images receives the image;
   segmenting the image, wherein the system identifies and detects a plurality of objects in the image and divides the objects in the image into a plurality of segmented images;
   classifying the image and the segmented images based on a classification model, wherein the system calculates correlation scores between the segmented images based on content, relative position, size, and correlation between the segmented images; and
   labeling the image, wherein the system assigns a label reflecting an overall aspect of the segmented images to the image based on the segmented images, the correlation scores, and a string network.

6. The method as claimed in claim 5, comprising a training step, wherein the system for classifying and labeling images builds the classification model based on at least one training image.

7. The method as claimed in claim 5, wherein the image is classified based on a character recognition circuitry in the step of classifying images.

8. The method as claimed in claim 6, wherein the training image comprises the image on which the step of labeling has been performed.

9. The method as claimed in claim 6, wherein the training image comprises the image on which a step of assigning a text description to the image has been performed.

* * * * *